(No Model.) 6 Sheets—Sheet 5.

J. H. NEWELL.
CORN HARVESTER.

No. 530,493. Patented Dec. 4, 1894.

Witnesses
Albert Speidell
Belle Elliott

John H. Newell, Inventor
By Attorney
W. E. Aughinbaugh (No Model.)  J. H. NEWELL.  6 Sheets—Sheet 6.
CORN HARVESTER.
No. 530,493.  Patented Dec. 4, 1894.
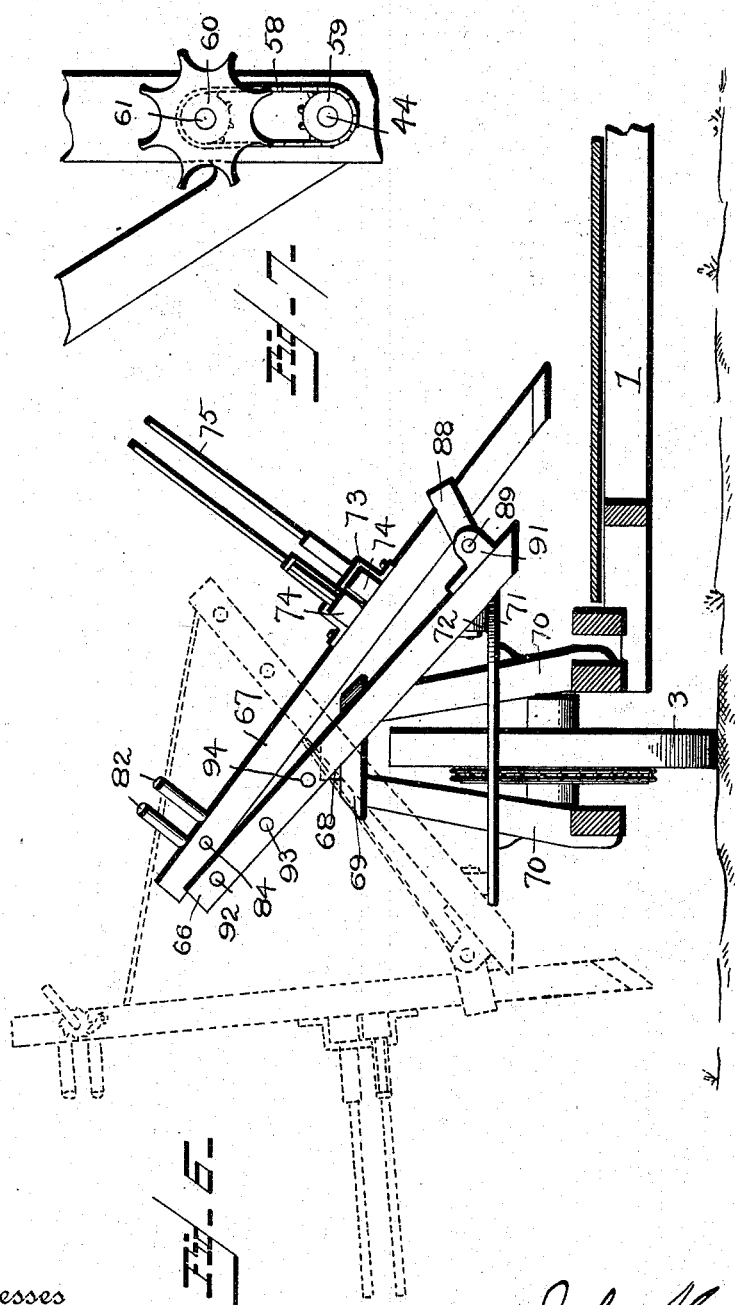

UNITED STATES PATENT OFFICE.

JOHN H. NEWELL, OF URBANA, OHIO.

CORN-HARVESTER.

SPECIFICATION forming part of Letters Patent No. 530,493, dated December 4, 1894.

Application filed September 6, 1893. Serial No. 484,940. (No model.)

*To all whom it may concern:*

Be it known that I, JOHN HENRY NEWELL, a citizen of the United States, and a resident of Urbana, in the county of Champaign and State of Ohio, have invented a certain new and useful Improvement in Corn-Harvesters, of which the following is a description.

This invention relates to an improvement in corn harvesters.

The object of the invention is to provide a corn harvester which will sever the stalks, transfer them to an apron, which latter will convey them to a shocker where they may be bound into shocks and deposited upon the ground at one side of the machine.

A further object is to provide a corn harvester having an apron adapted to move a predetermined distance and to stop, and mechanism whereby the apron may be returned to its normal position when desired.

A further object is to provide a corn harvester having a shocker provided with mechanism for grasping and rigidly holding the severed stalks in position until bound and discharged to the ground.

A further object is to provide a corn harvester having a series of rotary feeders so arranged in relation to each other, that one series will contact with the incoming stalks near their base, and the other series near their tops, whereby the stalks are prevented from falling either inward or outward in being urged to the knives.

With these objects in view the invention consists in the novel construction and combination of parts of a corn harvester, as will be hereinafter fully described and claimed.

Figure 1:
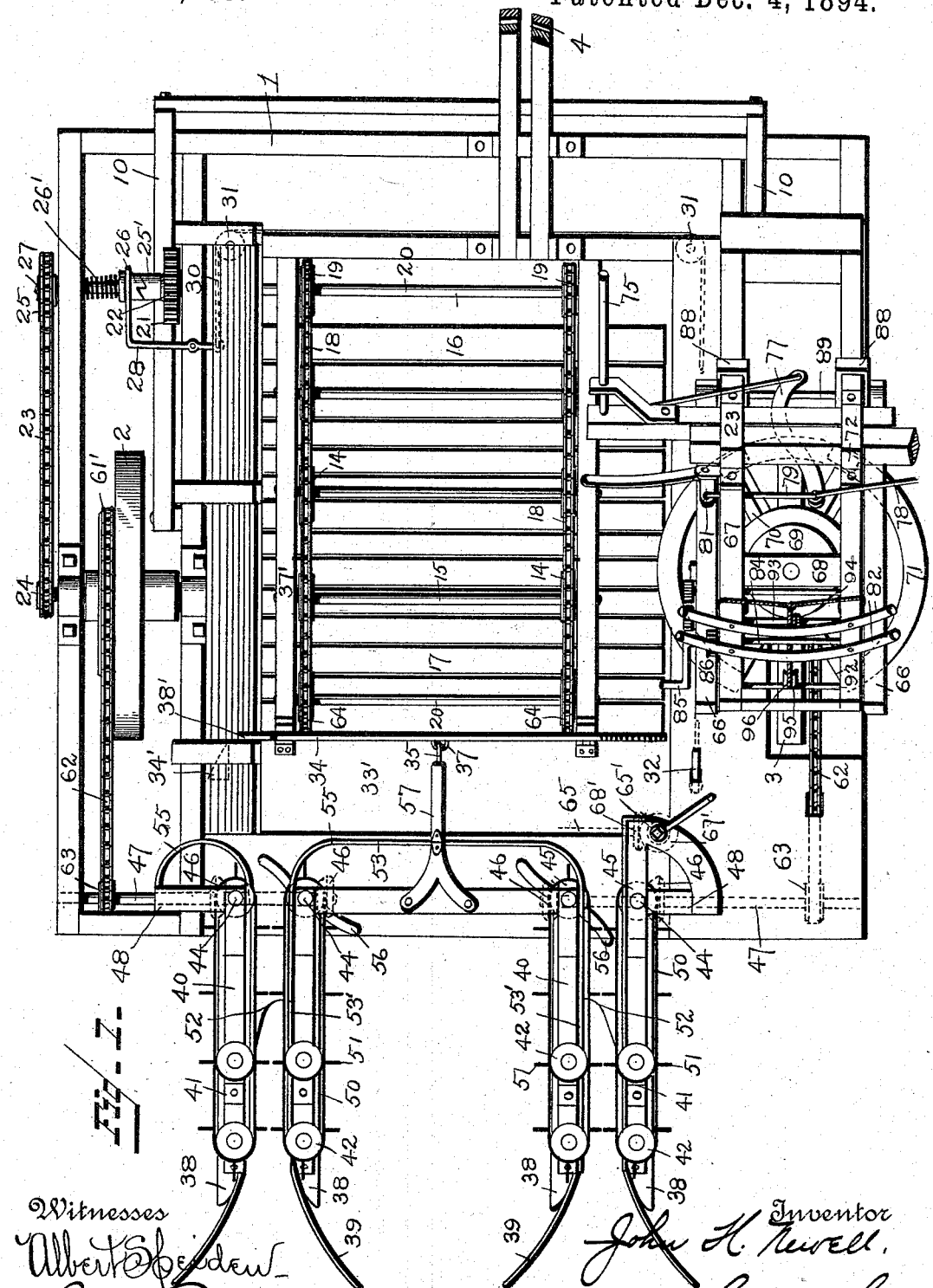
Figure 2:
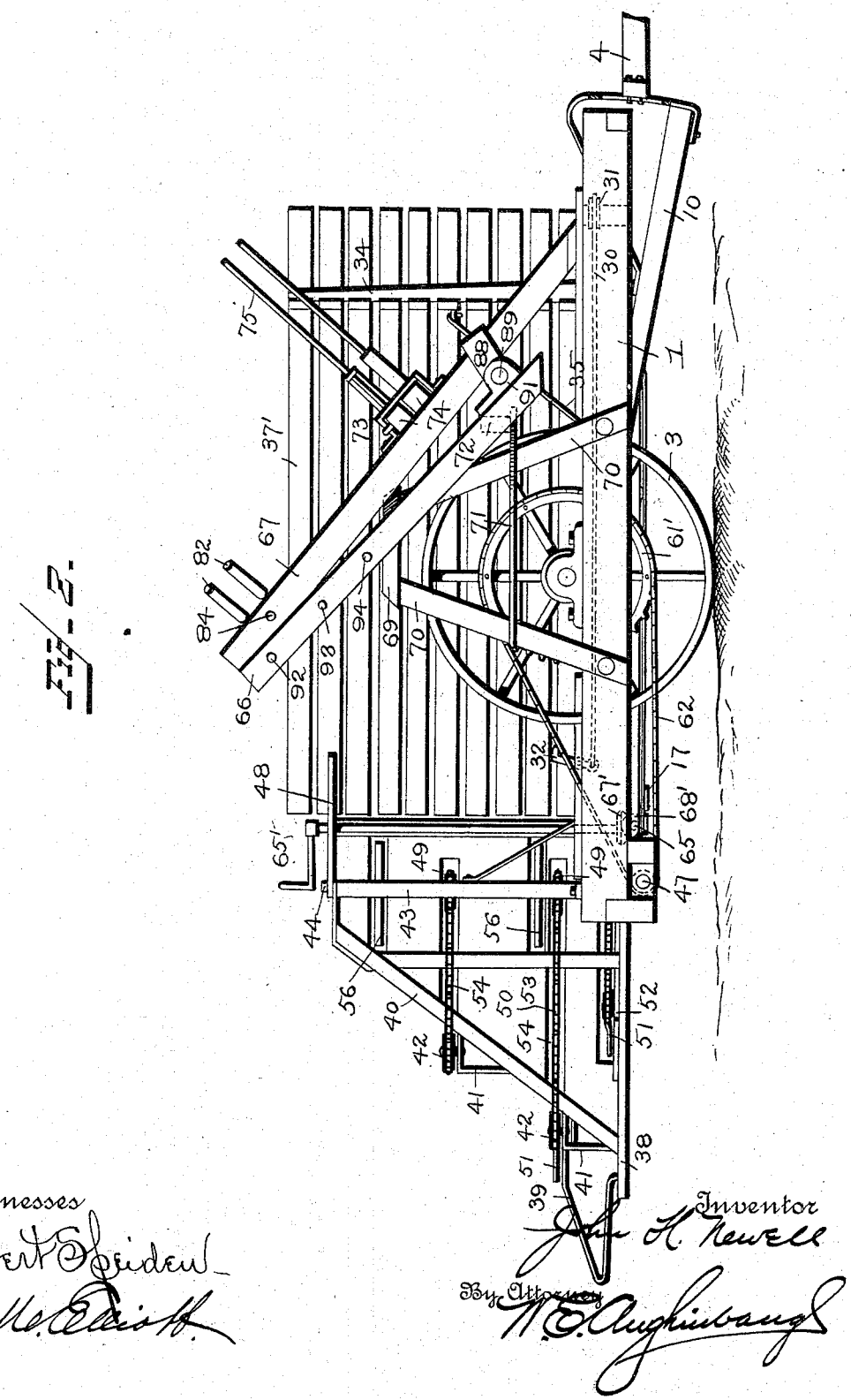
Figure 3:
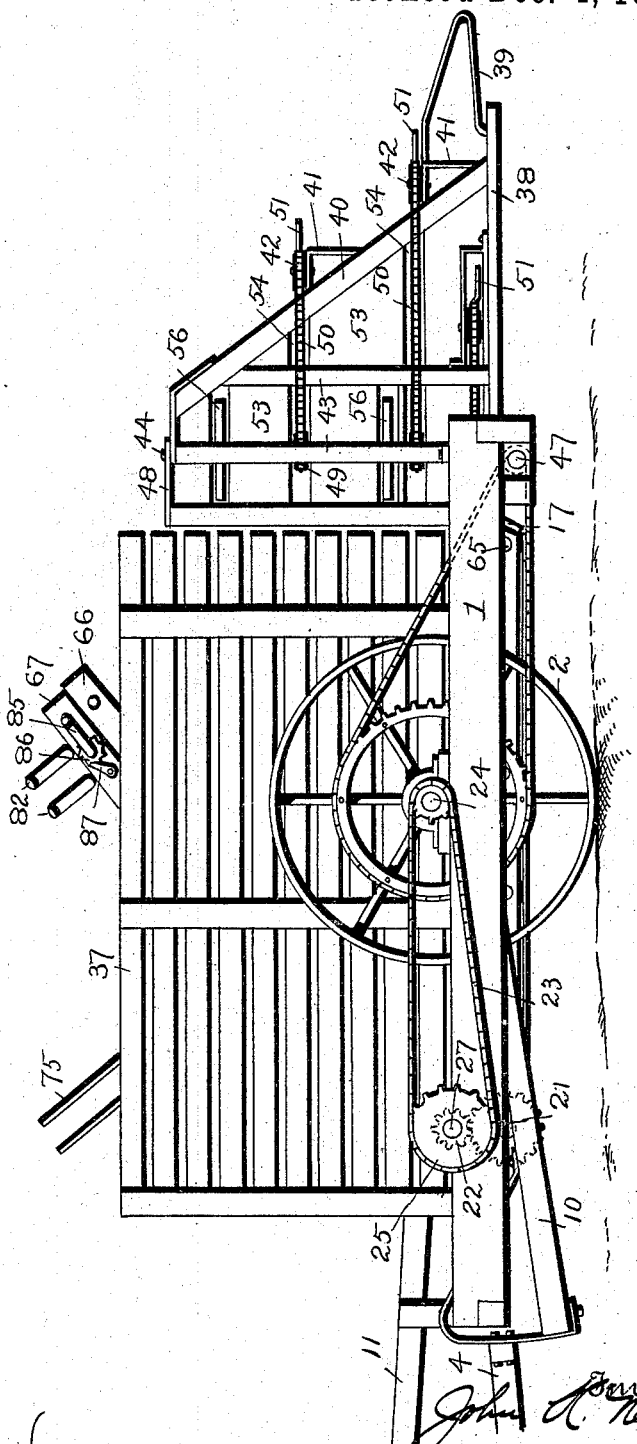
Figure 4:
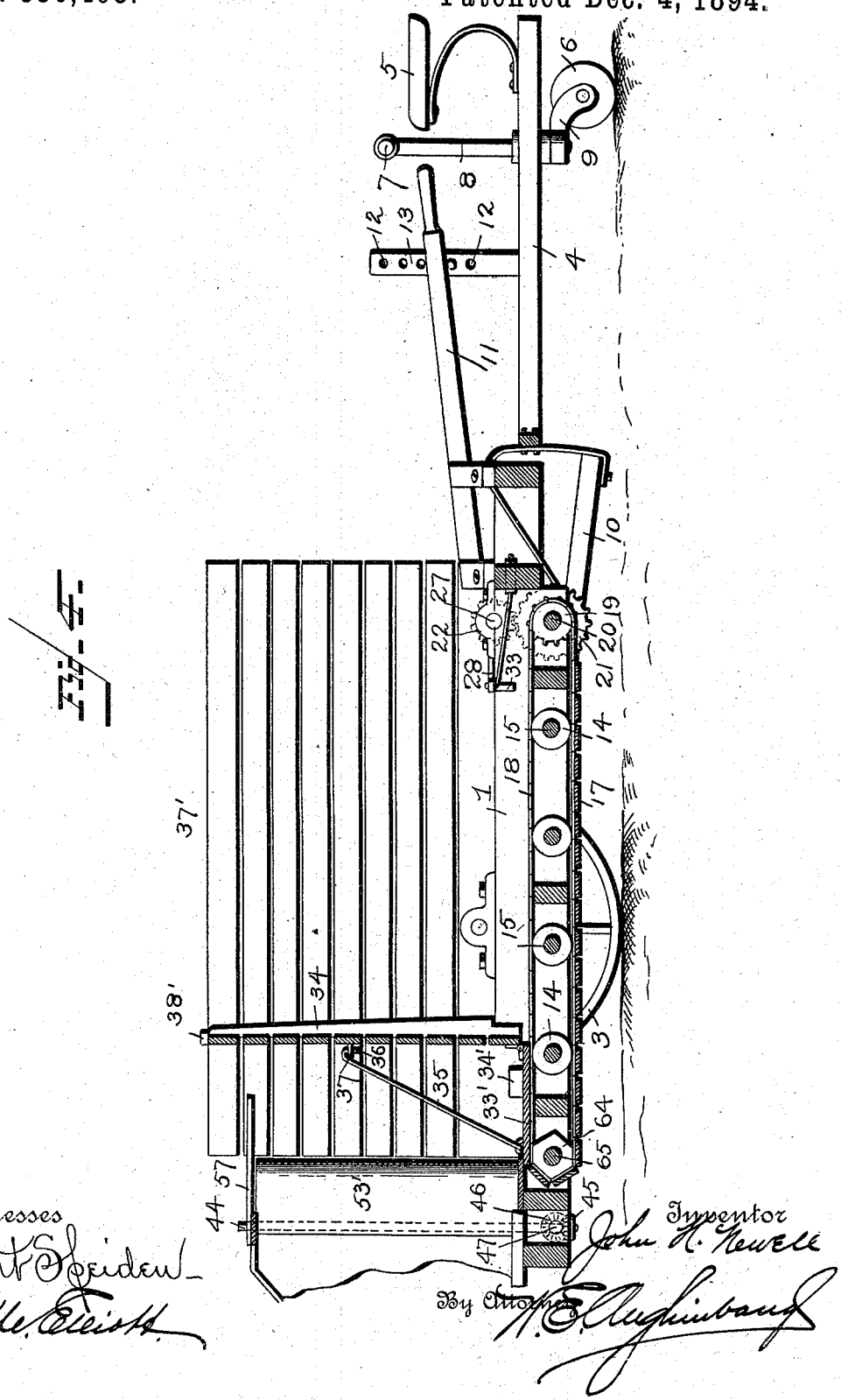
Figure 5:
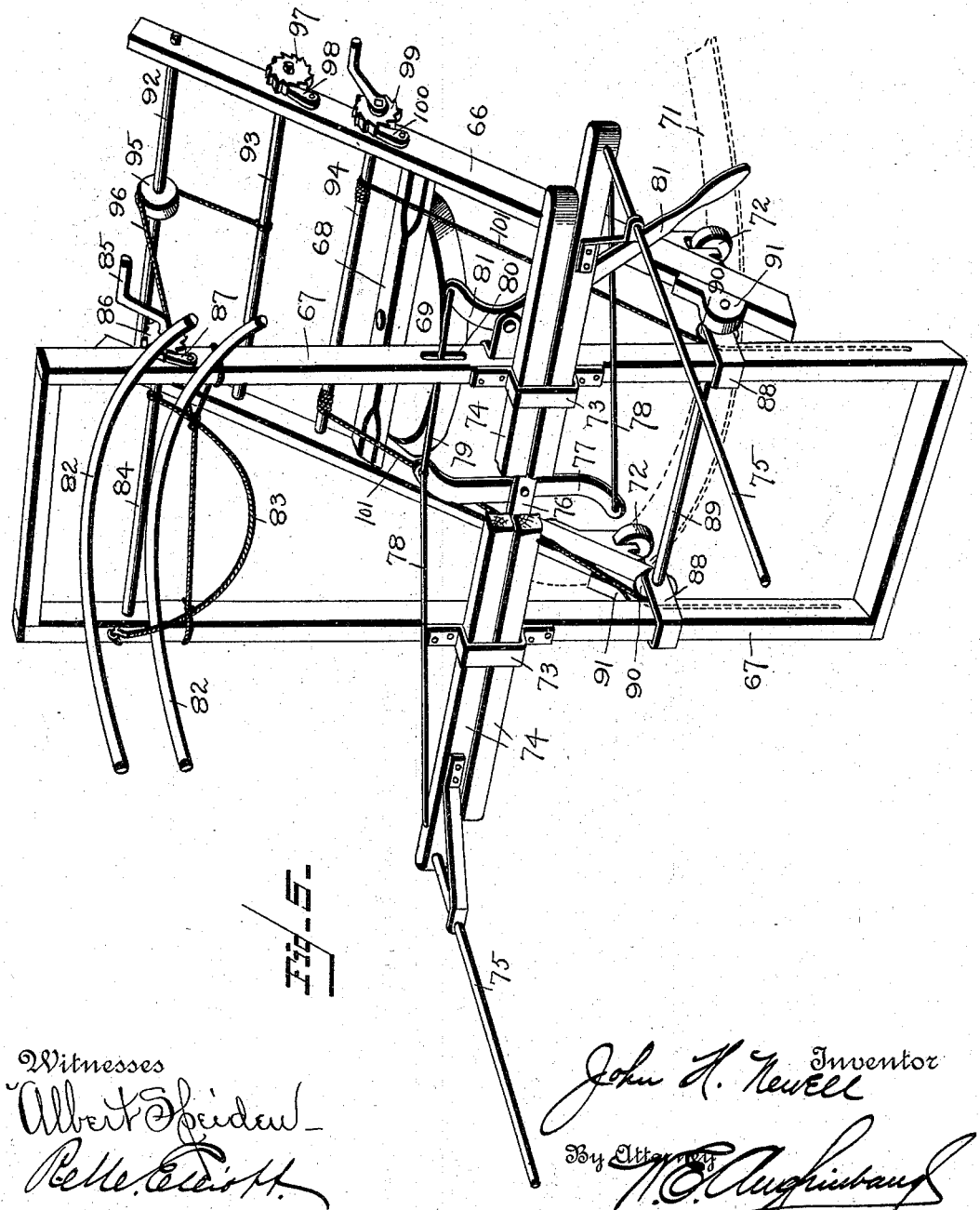

In the accompanying drawings forming a part of this specification, and in which like numerals of reference indicate corresponding parts, Figure 1, is a top plan view of the harvester. Fig. 2, is a side elevation taken on the left hand side of Fig. 1, looking toward the front of the machine. Fig. 3, is a similar view taken on the right hand side of the machine. Fig. 4, is a longitudinal sectional view. Fig. 5, is a perspective view of the shocker removed from the machine. Fig. 6, is a sectional view showing more particularly the respective positions occupied by the shocker in its open and closed position, the former position being shown in dotted lines. Fig. 7, is a view of a modified form of feeder for forcing the stalks against the knives.

Referring to the drawings, 1 designates the frame of the machine in which are suitably journaled two bull wheels 2 and 3, which through intermediate mechanism, to be described later on, operate the feed arms, packer arms and apron. Secured to the rear end of the machine is a tongue 4, which supports a seat 5, the said tongue being held in its proper elevated position by means of a caster 6, which latter may be turned to guide the machine by means of a cross-bar 7 carried by a standard 8 which is secured to the caster-horn 9, the front end of the tongue being secured to a pivoted bracket 10. The body of the machine is tilted so as to move the cutting mechanism, hereinafter to be described, to or from the ground by means of a hand-lever 11, the latter being held in its adjusted position by means of a pin passed through one of a series of openings 12 in a standard 13.

Supported upon suitable rollers 14 carried by shafts 15 journaled in the frame, is the apron 16, which may be of any approved construction, but preferably in this instance constructed of a series of connected slats 17, forming the top of the apron, which slats are secured to sprocket-chains 18 passing around sprocket-wheels 19 mounted on a shaft 20, the latter shaft carrying on its outer end a gear-wheel 21 in mesh with the gear 22 which receives motion through the bull-wheel 2 by means of sprocket-chain 23 and sprocket-wheels 24 and 25. The gear-wheel 22 carries a stationary clutch 25' which is designed to be engaged by a movable clutch 26 splined on the shaft 27 of the wheel 22, the clutch 26 being thrown out of engagement with the clutch 25' by means of a lever 28, to which is connected one end of a cord or chain 30, which passes around grooved pulleys 31 to the opposite side of the machine and is connected with a foot-lever 32 arranged near the front of the machine. The lower end of the lever 28 is provided with a toe or projection 33 adapted to be engaged by a trip 34' carried by the apron, said trip being designed to throw the clutch 26 out of engagement with the clutch 25' when the apron has reached its rearward limit to prevent further movement thereof.

To the front end of the apron is secured a platform 33' which is of sufficient width to accommodate a shock of corn, and upon the rear end of the platform is secured, preferably by a hinged connection, an abutment 34, the latter being held in a vertical position by means of a rod 35, which, as shown in Fig. 4, is provided with a hook-end 36 designed to engage a staple 37 carried by the abutment. By removing the hook 36 out of engagement with the staple the shield may be turned down flat, so as to lie upon the apron and thus occupy but a small space. In order to prevent any clogging of the stalks between the abutment 34 and the stalk-support 37', an arm 38' is employed which is secured to the abutment 34 and works along the top of the stalk-support as the apron is moved rearward.

Projecting from the front end of the machine and on each side thereof are two guides 38, each of which carries an outward flaring mouthpiece 39 designed to guide the stalks of corn between the said guides, as will clearly be understood by reference to Fig. 1.

To each of the guides 38 is secured an inclined beam 40, carrying a number of angle plates 41 on which are journaled sprocket-wheels 42, the said beams being supported in vertical position by means of standards 43. At a point in rear of the sprocket-wheels 42, and in alignment therewith, are journaled vertical shafts 44, the lower ends of which carry bevel gears 45 in mesh with similar gears 46 carried by transverse shafts 47, and the upper ends of the said shafts are journaled in brace-irons 48, secured respectively to the beams 40 and to the standards 43. Upon the shafts 44 are arranged a series of sprocket-wheels 49 which are arranged in horizontal alignment with the sprocket-wheels 42, and around the said sprocket-wheels pass sprocket-chains 50 carrying the feeder-arms 51. As shown in Fig. 2, the beam 40 is arranged at an angle with relation to the guides 38, and the sprocket-wheels 42 are arranged one in front of the other. By this construction, the lower series of feeder-arms contact with the incoming stalks, and serve to right them to a vertical position before the feeder-arms on the upper series of sprocket-chains come in contact with them, and by this means the stalks are held in a vertical position until forced against the knives 52 secured between the guides, where the stalks are severed and are forced onto the platform 33. In order to keep the stalks from contacting with the sprocket chains 50 a series of shields 53 and 53' are employed, one of which is secured to each of the guides, and are provided with longitudinal slots 54 through which the feeder-arms work. The inner shield 53' is continuous and is curved, as shown at 55, by which means the stalks are guided toward the center of the platform, this latter operation being assisted by means of rotary packer-arms 56 which are mounted upon the inner series of shafts 44 and operate in conjunction with the feeder-arms. In order to prevent the incoming stalks from becoming tangled a divider-arm 57 is employed which projects rearward and over the apron. As shown in Fig. 1, this arm is constructed of a stationary and of a movable portion, the latter portion being adapted to be turned back; but it is to be understood that if desired it may be made of a single piece. In place of the stationary knives shown in Fig. 1, a rotary knife may be substituted, as shown in Fig. 7, the latter being actuated by means of a sprocket-chain 58 which passes around a sprocket-wheel 59 one of which is arranged on each of the shafts 44, and around a sprocket-wheel 60 on the shaft 61 on which the rotary cutter is mounted. The shafts 47 are rotated by means of sprocket-chains 62 one of which passes around a sprocket wheel 61' carried by each of the bull-wheels and around the sprocket-wheels 63 on the said shafts.

The front end of the apron passes around a series of polygonal wheels 64, the faces of which are of a width equivalent to the width of one of the slats, the shaft 65 upon which these wheels are mounted being actuated by the movement of the apron.

The operation of the apron is as follows: The apron being in the position shown in Fig. 1, the machine is started and the stalks of corn are fed by the feeder-arms and the packer-arms onto the apron and are forced against the abutment 34, the sprocket-chain 23 causing the apron to move backward with the stalks until the platform 33 is opposite the shocker (presently to be described) when the shock is bound and discharged to the ground. As the apron moves backward, the trip 34' engages with the lever 28 and thus causes the clutch 26 to be moved out of engagement with the clutch 25' thereby stopping the apron immediately opposite the shocker. The clutch 26 is held out of engagement with the clutch 25' by means of the foot-lever 32 which is held down by means of the operator until the apron has been returned to its normal position, when by releasing the lever 32 the clutch 26 will again be automatically thrown into engagement with the clutch 25' by means of a spring 26'. The apron is returned to its normal position by means of the operator who turns a crank upon a vertical shaft 65' which carries at its lower end a bevel-gear 67' in engagement with a similar gear 68' of the apron shaft 65. As the apron moves rearward the shaft 65' is free to rotate in its bearings, and therefore does not interfere with the motion of the apron in any respect.

The shocker, to which reference has been made, consists of a pivoted frame 66 and a tilting frame 67. The pivoted frame is provided with a cross-piece 68 which is pivotally secured upon a platform 69, said platform being supported upon uprights 70 supporting a circular track 71 upon which bear rollers 72 carried by the frame 66. Secured upon the tilting frame are guides 73 in which work two longitudinally movable bars 74 each of which carries an outward projecting arm 75 between which the shock is adapted to rest while being bound, the bars 74 and arms 75 forming the compressor. Secured to the frame 67 at a point in rear of the bars 74 is a transverse piece 76 on which is pivoted an S-shaped lever 77 to which is connected at its ends two rods 78, one of which is secured to the outer end of each of the bars 74. Secured to the upper end of the lever 77 is a rod 79 which passes through a slot 80 in the side of the frame 67 and is connected with a curved lever 81. It will readily be seen that by moving the lever 81 up and down a vibrating motion will be imparted to the lever 77, which, through the medium of the rods 78, will cause the bars 74 to be moved in and out and thus compress or release the shock as the case may be. At the top of the frame 67 are secured two curved arms 82 against which the center of the shock is adapted to rest, the said shock being held in place against the arms by means of a cord or chain 83, one end of which is secured to the side of the frame 67 and the other end passes around a shaft 84 carrying at one end a crank 85 and a ratchet-wheel 86 adapted to be engaged by a pawl 87 on the frame. The rope or chain 83 is normally out of engagement with the shaft 84, and is brought into engagement therewith when it is desired to tighten the shock previous to binding, the ratchet and pawl serving to hold the rope perfectly taut until the binding is completed. The pivoted frame carries at its lower end two guides 88 in which work the sides of the frame 67, and through the guides passes a shaft 89 bearing grooved sheaves 90 the ends of the shaft 89 being journaled in boxes 91 on the pivoted frame. The frame 66 is provided with three transverse shafts 92, 93 and 94. The shaft 92 carries a grooved sheave 95 around which passes a rope 96 one end of which is secured to the tilting frame 67 and the other end to the shaft 93. The shaft 93 also carries a ratchet-wheel 97 which is engaged by a pawl 98 on the frame 66. By applying a crank to the squared end of shaft 93, and turning the same the rope 96 will be wound upon the said shaft and thus move the tilting frame to the position shown in full lines in Fig. 6, whereby to permit the shocker to be swung to one side to deposit the bound shock to the ground, the latter result being accomplished by throwing the pawl 98 out of engagement with the ratchet-wheel 97 so as to permit the rope 96 to unwind and the frame to drop to the position shown in dotted lines in Fig. 6. The shaft 94 carries a ratchet-wheel 99 engaged by a pawl 100, and also two ropes or chains 101, the upper ends of which are secured to the shaft 94 and the other ends to the lower portion of the frame 67, as clearly shown in Fig. 5. By applying a crank to the shaft 94 the tilting frame 67 may be elevated or depressed as may be desired in order to accommodate it to shocks of different heights.

The operation of the shocker is as follows: The stalks having been conveyed back by the apron, in the manner described, are stopped opposite the shocker, and the latter is swung around to permit the arms 75 to pass one on each side of the shock, and the lever 81 is operated to close the arms and thus compress the shock. The rope 83 is now passed around the center of the shock and by revolving the shaft 84 in the manner already described the said rope will bind the shock securely until a suitable binder is secured in place upon the shock. The shocker is then turned to one side and the tilting frame allowed to drop forward and thus discharge the shock to the ground.

Having thus fully described my invention, what I claim as new, and desire to secure by Letters Patent, is—

1. In a corn harvester, the combination with the cutting mechanism, of an apron adapted to move a predetermined distance, an abutment carried by the said apron, a platform arranged on the apron in front of the abutment and on which the severed stalks are adapted to rest, a shocker, and mechanism for arresting the motion of the apron opposite the shocker.

2. In a corn harvester, the combination with duplex cutting mechanism, of an apron, an abutment carried thereby, a platform arranged on the apron in front of the abutment, and a divider-arm arranged above the platform.

3. In a corn harvester, the combination with the duplex cutting mechanism, of a series of shields through which the feeding mechanism projects, an apron arranged contiguous to the ends of the shields, a divider-arm arranged above the shields, and an abutment carried by the apron.

4. In a corn harvester, the combination with the duplex cutting mechanism comprising a series of feeder arms, one series of which is arranged in advance of the other, a stationary knife and rotary packing arms co-acting with the rear portion of the feeder arms, of a series of shields through which the feeding mechanism projects, a reciprocating apron arranged contiguous to the ends of the shields, a divider arm arranged above the shields, and an abutment carried by the apron.

5. In a corn harvester, the combination with the cutting mechanism and the apron, of a platform provided with a track, a frame pivoted to the platform and having rollers bearing upon the track, a second frame pivotally connected with the pivoted frame and having laterally movable compressor arms and mechanism for opening and closing the same, and mechanism for adjusting the second frame vertically and for tilting it to the desired point.

In testimony whereof I hereunto affix my signature in the presence of two witnesses.

JOHN H. NEWELL.

Witnesses:
 LOUIS D. JOHNSON,
 CHAS. JOHNSON.